March 25, 1941.  W. B. MOORE  2,236,197

PHOTOGRAPHIC PRINTING EASEL

Filed Jan. 16, 1940

INVENTOR
Walter B. Moore.
BY Corbett + Mahoney
ATTORNEYS

Patented Mar. 25, 1941

2,236,197

UNITED STATES PATENT OFFICE 2,236,197

PHOTOGRAPHIC PRINTING EASEL

Walter B. Moore, Coshocton, Ohio

Application January 16, 1940, Serial No. 314,113

5 Claims. (Cl. 88—24)

My invention relates to a photographic printing easel. It has to do, more particularly, with a printing easel for receiving and retaining sensitized photographic paper upon which images are projected by a strong light through negatives to impress the positive image on the sensitized paper which is later developed and properly fixed and then becomes the photograph proper.

Printing easels which are most commonly used at the present time include a base having a frame hinged thereto and under which the sensitized paper is slipped. Two sides of the frame are adjustable relative to the other sides so that the frame will fit different sized paper. This adjustment is difficult to make. Also, with this prior art structure it is difficult to properly position the photographic paper under the frame. Furthermore, such frames do not effectively grip the photographic paper.

One of the objects of my invention is to provide a photographic printing easel which is of a very simple structure and which can be manufactured at a low cost but which is very effective for the purposes for which it is intended.

Another object of my invention is to provide a photographic easel which is of such a nature that the sensitized photographic printing paper may be quickly and easily properly positioned on the easel.

Another object of my invention is to provide a photographic printing easel which is of such a nature that the sensitized photographic paper will be firmly gripped throughout its entire area and will be maintained perfectly flat thereby providing horizontal alignment with the enlarging or printing lens of an enlarger with which my device may be associated.

The preferred embodiment of my invention is illustrated in the accompanying drawing wherein in similar characters of reference designate corresponding parts and wherein.

Figure 1:
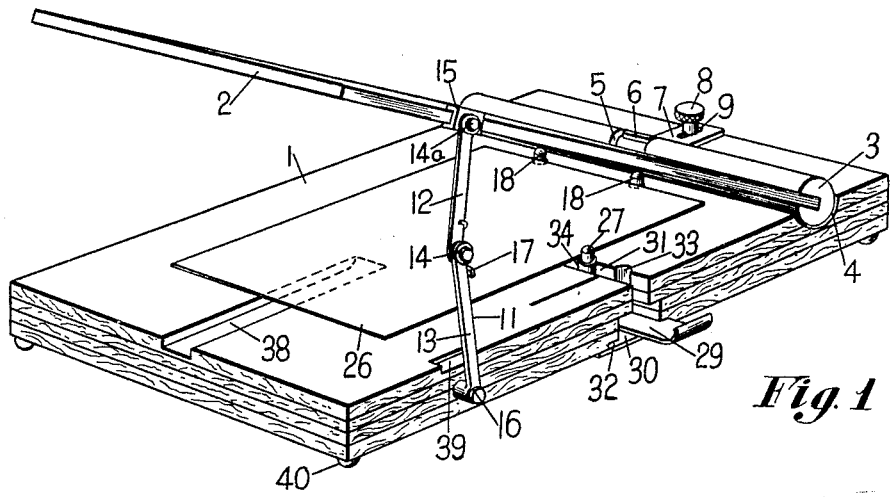
Figure 1 is a perspective view of a photographic printing easel made according to my invention.

With reference to the drawing, I have illustrated my easel as comprising a base member 1. This base member is composed of a suitable board. It preferably comprises several layers of plyboard cross grained in order to provide an easel board that will not be affected by moisture and temperature changes that might warp a board of one grain.

For cooperation with the base 1, I provide a plate 2 of glass. This is preferably composed of plate glass which is perfectly clear. At one end the plate 2 of glass is inserted and suitably held in a slot extending longitudinally of a cylindrical holder 3. This holder 3 is preferably composed of non-rustable material such as solid bronze. The cylindrical member 3 serves as a roller hinge and fits into a transversely extending groove 4 formed in the top surface of the base 1 adjacent one end thereof. The groove 4 is substantially semi-circular in cross section.

Figure 2:
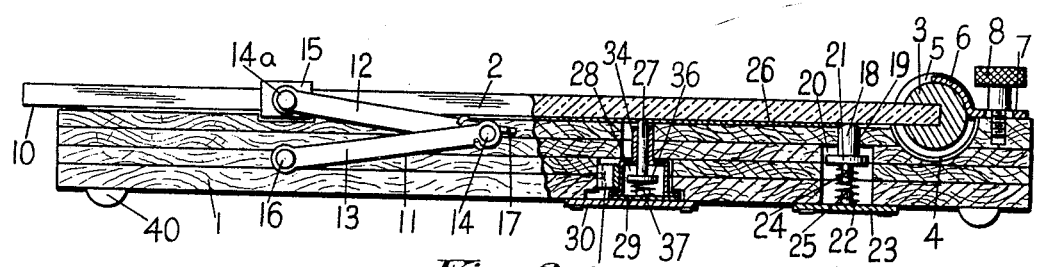
Figure 2 is a view partly in side elevation and partly in longitudinal section showing my easel.
Figure 3:
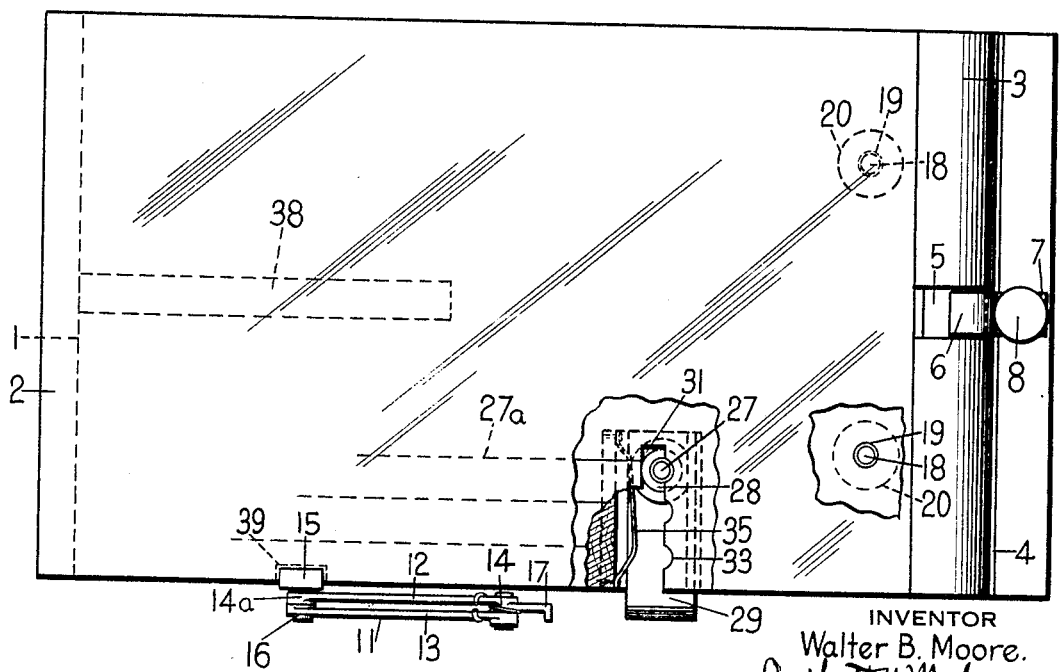
Figure 3 is a plan view of the easel, partly broken away.

It will be apparent that this serves as a hinge structure for one end of the glass plate. The glass may be swung from the position indicated in Figure 1 downwardly until it rests on the base 1, as indicated in Figure 2. In order to prevent longitudinal movement of the roller 3 in the groove 4, the roller is provided with a centrally disposed recess 5 extending around the circumference thereof. This recess 5 receives a curved portion 6 of a clip 7. The curved portion 6 extends one-fourth of the distance around the member 3. The clip 7 is secured to the base 1 by means of a screw 8 which is threaded into the base and which passes through a slot 9 formed in the clip.

It will be noted from Figure 2 that when the plate 2 is swung down to its lowermost position, the forward edge thereof will project beyond the base 1, as indicated at 10, in Figure 2. This projecting portion facilitates raising of the glass plate. The recess 4 is made slightly deeper than the radius of the roller 3 so that when the plate 2 is swung down into contact with the base 1, it will firmly contact therewith since the bottom of the roller 3 will not rest on the bottom of the groove 4. In order to hold the plate 2 in its uppermost position, as indicated in Figure 1, I provide a hinge structure 11 secured to the base 1 and plate 2 adjacent the forward ends thereof. This structure comprises bars 12 and 13 pivoted together as at 14. The other end of member 12 is pivoted at 14a to a metal clip 15 suitably secured to the edge of the glass plate. The other end of member 13 is pivoted at 16 to the edge of the base 1. A stop member 17 is provided on member 12 for engaging member 13. This stop member will permit the pivot point 14 to move beyond the pivots 14a and 16, when the plate 2 is swung to its uppermost position, so that the plate will be held in its uppermost position and there will be no danger of its accidentally falling.

In order to properly position the sensitized photographic printing paper on the base 1, I provide the following structure. Adjacent the groove 4 I provide a pair of guide pins 18. These guide pins are spaced from each other and are disposed along a line that is substantially parallel with the groove 4. Each of the pins 18 projects upwardly through an opening 19 formed in the top plyboard of the base 1. The lower portion of the pin is disposed in a recess 20 formed in the other layers of plyboard. The pin 18 has a head 21 on its lower end which is engaged by a compression spring 22. This compression spring 22 bears against a metal plate 23 which is secured to the lower surface of the base 1 and covers the recess 20. Projections 24 and 25 are provided on the head 21 and plate 23 for keeping the spring 22 in its proper position. It will be apparent that the pins 18 will normally be forced upwardly by the springs 22, the upward movement being limited by the heads 21. When the plate 2 is in its uppermost position, these pins 18 will project above the top surface of the base 1 and will engage the upper edge of the photographic paper 26, as indicated in Figure 1.

In order to provide a guide at the side edge of the paper, I provide a guide pin 27. This pin is mounted for vertical movement in a small metal housing 28 which is carried by a slide member 29. The slide member 29 rests on a plate 30 which is secured to the lower surface of base 1 and which covers a slot 31 formed in the base. The edge of this slide projects into a guideway 32 formed directly above the plate 30. The edge of the slot 31 is provided with vertically disposed notches 33 formed therein at suitably spaced points. The upper tubular portion 34 of the housing 28 is adapted to fit into any of these notches 33. A leaf spring 35 engages one side of the housing 28 and tends to force the slide 29 laterally into the guide portion 32 and to force the portion 34 of housing 28 against the edge of the slot 31 and into a notch 33 when it is brought into alignment therewith. It will be apparent that with this structure, by moving the slide 29, the housing 28 may be moved to various positions so that the portion 34 will be moved into any of the notches 33. The pin 27 is provided with a head 36 on its lower end which is engaged by a compression spring 37 disposed in the housing 28. This compression spring serves to force the pin 27 upwardly. Thus, when the plate 2 is in the position indicated in Figure 1, the pin 27 will project upwardly and will engage the edge of the paper 26.

If the sensitized paper is positioned in the device when the plate 2 is swung upwardly, the top edge of the paper will contact with the pins 18 which are in set position. The side edge of the paper will contact with the pin 27. Thus, the paper will be properly positioned on the base. The pin 27 may be moved to various positions depending upon the size of the paper. These positions will be indicated by lines 27a on the upper surface of the base. Consequently, the paper may always be positioned centrally of the base. The base is provided wtih an elongated recess 38 formed in the upper surface thereof adjacent the forward end thereof. This recess will facilitate lifting of the paper off the base. A recess 39 is formed in the top surface of the base 1 at the edge thereof for receiving the clip 15 when the plate 2 is in its lowermost position. The base 1 may have a plurality of rubber buttons 40 on its lower surface so that it may be disposed on the table and will not slide relative to the surface thereof.

It will be apparent that with my easel, the glass plate 2 may be readily swung between its uppermost position shown in Figure 1 and its lowermost position shown in Figure 2. When in the Figure 1 position, the sensitized photographic paper 26 may be readily positioned on the base and the position of the paper will be determined by the pins 18 and 27. When the plate 2 is in its lowermost position, the photographic paper will be firmly gripped between the plate and the base. As the plate moves into its lowermost position in engagement with the base 1, the pins 18 and 27 will be forced downwardly. Thus, they will not prevent proper contact of the plate 2 and the base 1.

Various other advantages will be apparent from the drawing, the preceding description and the following claims.

Having thus described my invention, what I claim is:

1. A photographic printing easel comprising a base member upon which the printing paper is adapted to rest, a glass plate, a hinge structure for hinging one edge of the glass plate to the base, said hinge structure including a roller which has a longitudinally extending slot formed therein which receives the edge of the glass plate, said base member having a groove of semicircular form therein for receiving the roller, said groove being of a depth greater than the radius of the roller so that the plate will firmly contact with the base throughout its area when swung downwardly into cooperative relationship therewith, and means for preventing longitudinal movement of the roller in the groove, said means comprising a member secured to the base, said member having a portion projecting into an annular groove formed in said roller member.

2. A printing easel comprising a base member upon which the printing paper is adapted to rest, a glass plate, a hinge structure for hinging one edge of the glass plate to the base, said hinge structure including a roller to which one edge of the plate is secured, said base member having a groove formed therein for receiving the roller, said groove being of a depth greater than the distance from the lower surface of the plate to the lowermost point on the roller so that the plate will firmly contact with the base throughout its area when swung downwardly into cooperative relationship therewith, and means for preventing longitudinal movement of the roller in the groove.

3. A printing easel comprising a base member upon which the printing paper is adapted to rest, a paper-retaining plate, a hinge structure for hinging one edge of the paper-retaining plate to the base, said hinge structure including a roller to which one edge of the plate is secured, said base member having a groove formed therein for receiving the roller, said groove being of a depth greater than the distance from the lower surface of the plate to the lowermost point on the roller so that the plate will firmly contact with the base throughout its area when swung downwardly into cooperative relationship therewith.

4. A printing easel according to claim 3 wherein guide members are carried by the base member to properly position the paper thereon, said guide members comprising guide pins for engaging the edge of the paper, said guide pins being mounted on the base member in suitable openings formed therein, and springs associated with each of said guide pins for normally forcing them upwardly beyond the top surface of the base but permitting downward movement of the pins when the glass plate is swung into cooperative relationship with the base to permit the plate to firmly contact with said base.

5. A printing easel according to claim 3 wherein a guide member is provided for engaging the edge of a paper, said guide member embodying a spring-pressed plunger disposed in a housing mounted in a slot formed in said base member, said housing being carried by a movable slide, said slot being provided with notches in one edge thereof with any of which said housing is adapted to cooperate, and a spring associated with said slide for normally moving it laterally to maintain the housing in one of said notches.

WALTER B. MOORE.